Feb. 15, 1966 L. GOLUB ETAL 3,234,578
WINDSHIELD WIPER
Original Filed Aug. 3, 1960
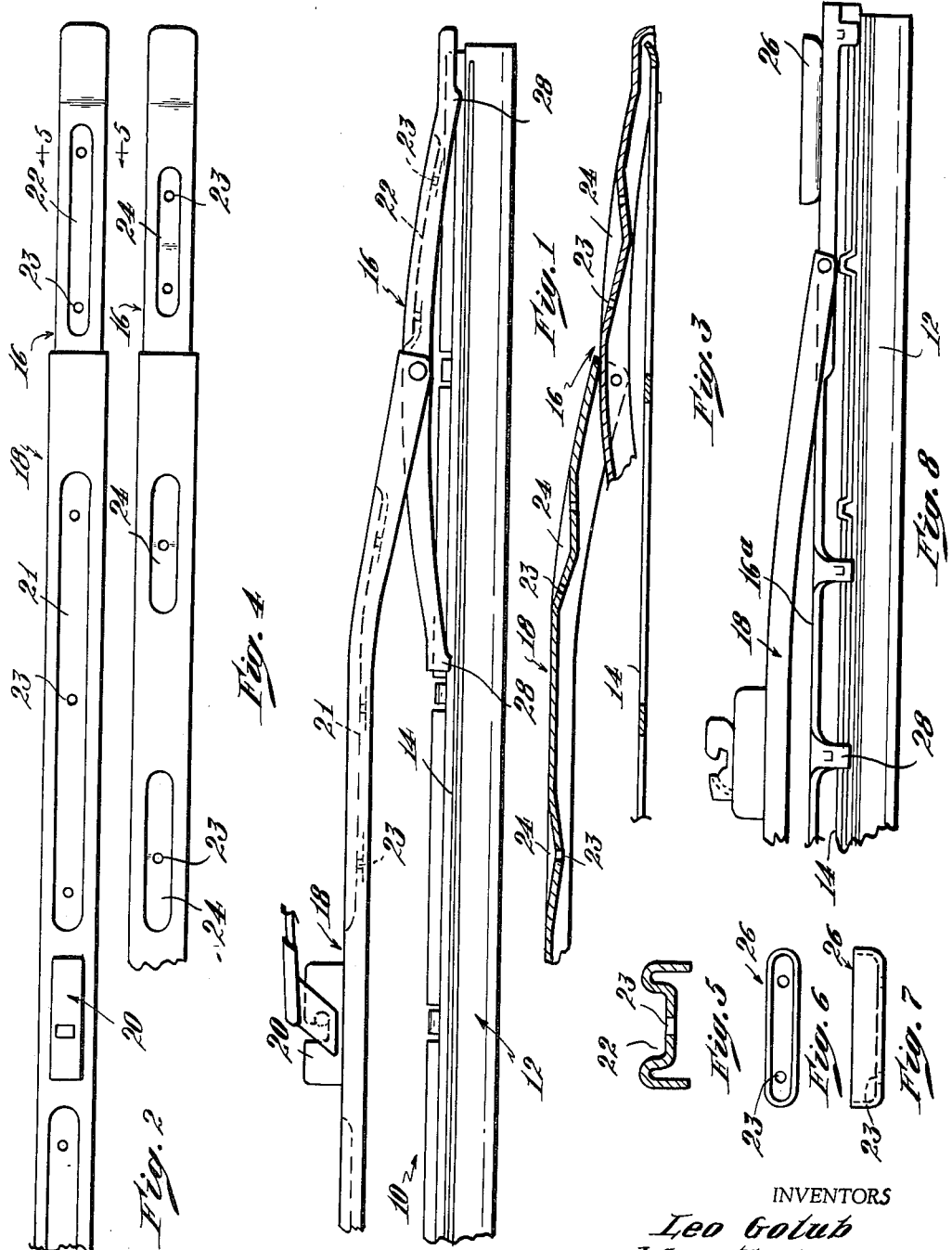
INVENTORS
*Leo Golub*
*Max Zaiger*
by Roberts, Cushman & Grover
ATT'YS

United States Patent Office

3,234,578
Patented Feb. 15, 1966

3,234,578
WINDSHIELD WIPER
Leo Golub, Marblehead, Mass., and Max Zaiger, 49 Atlantic Road, Swampscott, Mass.; said Golub assignor, by mesne assignments, to said Zaiger
Original application Aug. 3, 1960, Ser. No. 66,382, now Patent No. 3,103,687, dated Sept. 17, 1963. Divided and this application Sept. 6, 1963, Ser. No. 307,069
3 Claims. (Cl. 15—250.42)

This invention relates to windshield wipers for vehicles and especially to an improvement in construction which provides for holding relatively long blades, such as are used on curved windshields, in intimate contact with the surface throughout their movement back-and-forth in spite of the deflecting pressure of the wind developed by the forward movement of the vehicle and/or crosswise gusts of wind.

As herein illustrated, lifting or deflection of the wiper blade is prevented by means applied to the blade-supporting frame designed to apply the reactive force of the air pressure thereon, created by the forward motion of the vehicle, in a direction to press the blade more firmly against the surface of the windshield, and by openings through the frame for venting and dissipating the air pressure developed between the frame and the windshield thus preventing such pressure from lifting the wipers away from the windshield.

The invention will now be described in greater detail with reference to the accompanying drawings wherein:

FIG. 1 is a fragmentary elevation of a wiper blade assembly having a main supporting frame and secondary end supporting frames;

FIG. 2 is a plan view of FIG. 1;

FIG. 3 is a fragmentary elevation, partly in section, of an alternative construction;

FIG. 4 is a plan view of FIG. 3;

FIG. 5 is a transverse section, to much larger scale, taken on the line 5—5 of FIG. 2;

FIGS. 6 and 7 are plan and elevational views of a cup member; and

FIG. 8 is a fragmentary elevation of an alternative structure having a single supporting member for the blade.

Referring to FIGS. 1 to 7 inclusive, there is shown a blade 10 comprising a squeegee 12, a back 14 to which the squeegee is anchored, a pair of supporting arms 16—16 with which the end portions of the back are slidably engaged, and a bow 18 to the ends of which the arms 16 are pivotally connected. The blow 18 has at its center a latch plate 20 by which it is detachably mounted on the end of a wiper arm of conventional construction. A single flexible support 16a may be substituted for the arms 16—16 as shown, for example, in FIG. 8 and, as there shown, is directly connected to the ends of the bow 18.

The blade 10 is comparatively long, for example, with many of the newer type curved windshields may be as long as 30 inches. It is difficult to keep a blade of such length in intimate contact with the surface throughout its entire length particularly when the windshield is curved in two directions. Moreover, the wind travelling parallel to the surface of the windshield tends to lift the blade off its surface. To nullify this the moving parts of the wiper assembly are designed to make use of the air pressure created by the forward motion of the vehicle to set up a reactive force such as to press the wipers against the windshield. As herein illustrated, this is accomplished by providing grooves or pockets which will catch the wind and vents for dissipating pressure which builds up behind the wiper parts between it and the windshield. Thus, for example, the back of the bow 18 may have a shallow groove 21 lengthwise thereof (FIGS. 1 and 2). Additionally, the arms 16—16 may have shallow grooves 22 in the portions extending beyond the ends of the bow. Instead of a continuous groove the outer surfaces of the bow and the arms may contain a plurality of shallow spaced depressions or pockets 24 (FIGS. 3 and 4). Alternatively, pocket pieces or cups 26 (FIGS. 6 and 7) may be riveted to the bow and to the arms.

In the form of the invention shown in FIG. 8, since a single suport 16a replaces the arms 16—16 the back of the support 16a may have a shallow groove or pocket pieces fastened to it. By disposing the pockets strategically the pressure may be distributed uniformly over the entire blade so as to hold it in intimate contact with the surface.

To permit escape of surface pressure beneath the blades small openings 23 may be formed lengthwise of the bow and arms, for example, at the bottoms of the pockets which act as vents. The air escaping through the vents produces a reaction which tends to hold the blade against the surface.

To take full advantage of the wind pressure for holding the blade in engagement with the windshield the blade itself must be uniformly flexible and must be held so that it can conform to the curvature of the windshield without constraint.

As herein illustrated, this flexibility is attained by providing each supporting arm 16 of the wiper assembly illustrated in FIG. 1, or the support 16a of the wiper assembly shown in FIG. 8, with pairs of downwardly and inwardly extending lugs 28—28 for receiving the back 14 which is comprised of thin, flexible metal containing openings within which the squeegee blade 12 is anchored. The blade and its backing are retained in place by the means described in the pending application of Leo Golub and Max Zaiger, filed August 3, 1960, Serial No. 66,382, now Patent No. 3,103,687 of which this application is a division.

It should be understood that the present disclosure is for the purpose of illustration only and that this invention includes all modifications and equivalents which fall within the scope of the appended claims.

We claim:

1. A windshield wiper comprising an elongate flexible wiper member, an elongate flexible supporting structure supporting the flexible member for cooperation with the windshield, said supporting structure being transversely relatively narrow and transversely spaced surfaces at the back of the supporting structure substantially perpendicular to said back forming, in conjunction therewith, channel-shaped pockets at predetermined intervals longitudinally of the supporting structure which trap and reverse the direction of impingement of the wind upon the back of the supporting structure, said supporting structure containing vent holes through the back to relieve the pressure developed between the supporting structure and the windshield.

2. A windshield wiper according to claim 1, wherein the channel-shaped pockets are constituted by depressions formed in the back at intervals lengthwise thereof.

3. A windshield wiper according to claim 1, wherein the channel-shaped pockets are constituted by channel members fastened to the back of the supporting structure.

References Cited by the Examiner

UNITED STATES PATENTS

| | | | |
|---|---|---|---|
| 2,739,770 | 3/1956 | Fanti et al. | 244—41 |
| 2,937,393 | 5/1960 | Brueder | 15—250.42 |
| 3,006,018 | 10/1961 | Golub et al. | 15—250.42 |
| 3,037,233 | 6/1962 | Peras et al. | 15—250.42 |
| 3,056,991 | 10/1962 | Smithers | 15—250.42 X |
| 3,089,174 | 5/1962 | Bignon | 15—250.36 |

CHARLES A. WILLMUTH, *Primary Examiner.*